United States Patent [19]

Montgomery et al.

[11] Patent Number: 4,670,201
[45] Date of Patent: Jun. 2, 1987

[54] PROCESS FOR MAKING PITCH-FREE GRAPHITIC ARTICLES

[75] Inventors: Lionel C. Montgomery, Bay Village; John M. Criscione, Parma, both of Ohio

[73] Assignee: Union Carbide Corporation, Danbury, Conn.

[21] Appl. No.: 810,546

[22] Filed: Dec. 18, 1985

Related U.S. Application Data

[63] Continuation of Ser. No. 534,050, Sep. 20, 1983, abandoned.

[51] Int. Cl.$^4$ ............................................. B29C 35/12
[52] U.S. Cl. ..................................... 264/26; 264/27; 264/29.3; 264/29.5; 264/29.6; 264/85; 264/105; 264/125; 423/448
[58] Field of Search ................... 264/29.3, 29.5, 29.6, 264/105, 125, 26, 27, 85; 423/448

[56] References Cited

U.S. PATENT DOCUMENTS

| | | | |
|---|---|---|---|
| 3,405,205 | 10/1968 | Rowe et al. | 264/105 |
| 3,470,003 | 9/1969 | Waylett | 106/56 |
| 3,479,423 | 11/1969 | Wohlberg | 264/105 |
| 3,672,936 | 6/1972 | Ehrenreich | 264/29.5 |
| 3,736,159 | 5/1973 | Gibson et al. | 264/29.1 |
| 3,993,738 | 11/1976 | Overholser et al. | 264/29.3 |
| 4,046,863 | 9/1977 | Kobayashi et al. | 423/448 |
| 4,075,114 | 2/1978 | Ishikawa et al. | 423/448 |
| 4,102,960 | 7/1978 | Borkowski | 264/105 |
| 4,188,279 | 2/1980 | Yan | 264/29.5 |
| 4,202,868 | 5/1980 | Hayashi et al. | 423/448 |
| 4,396,482 | 8/1983 | Das et al. | 264/85 |
| 4,397,083 | 8/1983 | Catanzarite | 264/105 |
| 4,399,083 | 8/1983 | Inoue | 264/29.3 |
| 4,439,382 | 3/1984 | Joo et al. | 264/29.5 |

OTHER PUBLICATIONS

"The Condensed Chemical Dictionary", 10th ed., Grssner G. Hawley, Van Nostrand Reinhold Company, pp. 143 and 144.
"Reaction of Chromium, Molybdenum and Tungsten Borides with Carbon" 2/6/65, Levinskii et al., pp. 1004-1005.
Handbook of Binary Metallic Systems Structure and Properties" vol. 1, pp. 468-469 REF TN 674 V88 V.1.
"Effects of Addition of Borides on Sintering and Graphitization of Coke", Hagio, et al., *Yogyo Kyokai-Shi*, 87: [8] pp. 416-422, 1979.

*Primary Examiner*—Jeffery Thurlow
*Attorney, Agent, or Firm*—James L. Sonntag

[57] ABSTRACT

High density composites consisting of graphite and metal borides by pressing blended powders of pitch-free coke and boride powder. The pressing may be hot pressing at temperatures of about 2200° C. and pressure of about 1500 psi or cold pressing at about room temperature followed by high temperature sintering. Some of the boron from the boride diffuses substitutionally into the structure at the processing temperatures promoting graphitization; whereby densification and bonding the resulting degree of graphitization of the shapes is comparable to that of conventional graphite articles processed at temperatures in excess of 2800° C. The mechanical strength of these composites is equivalent to and often exceeds the strength of conventional graphites and the oxidation resistance in dry air is much superior at temperatures as high as 800° C. Overall processing time is reduced from months to days thus improving the economics of the process.

10 Claims, No Drawings

PROCESS FOR MAKING PITCH-FREE GRAPHITIC ARTICLES

This application is a continuation of prior U.S. application Ser. No. 534,050, filing date 9/20/83 now abandoned.

BACKGROUND OF THE INVENTION

This invention relates to pitch-free graphite articles and to a process for making the same without using a conventional binder such as pitch as is employed in the prior art.

Most graphite articles require a pitch binder phase to cement carbon particles together since carbon does not melt or form liquid phases at moderate temperatures and pressures. The process is complicated, costly, and time consuming.

When a pitch binder is used, gases from volatile matter are produced and escape from the carbon solid by the decomposition of the pitch binder phase during baking to form carbon, leaving some voids or pores in it. Therefore, in order to make a high-density, strong, carbon, techniques have been used such as repeated impregnation with pitch and heat-treatment in an autoclave, use of high yield pitches or filling up pores with a decomposition of pyrolytic carbon. Even by these treatments, it is difficult to obtain dense graphite solids with low permeability.

The demand for development of new advanced carbon materials has been increasing in various scientific fields to support recent advanced technology, especially development of strong and dense graphite materials which can be used in various new fields such as aerospace, biomaterials, nuclear applications, mechanical seals, crucibles, and high temperature machine parts.

Graphite products are currently produced by the complicated and lengthy process described below:

| | |
|---|---|
| 1. HOT MIXING: | Carbonaceous material, usually calcined coke, is hot mixed with pitch to coat the coke particles with pitch. |
| 2. FORMING: | The hot mixes are either extruded or molded into shapes. |
| 3. BAKING: | Formed shapes are baked very slowly, 5° C./hr, to about 850° C. to decompose the pitch and convert it to coke. |
| 4. IMPREGNATION REBAKE: | Baked shapes are impregnated with pitch type materials to increase density followed by rebaking; frequently more than one cycle is needed. |
| 5. GRAPHITIZATION: | Baked shapes are reheated to 2800° C. to thermally rearrange the carbonaceous material into a crystalline form having an ordered pattern of stacked parallel planes characteristic of graphite. This is accompanied by a desirable change in the physical properties. |

BACKGROUND OF DISCLOSURE

There are numerous patents relating to the making of shaped carbon and graphite articles. This background disclosure is restricted to those which are believed to be most relevant.

Believed to be the single most relevant is U.S. Pat. No. 4,046,863 which claims a process for producing graphite articles with densities of at least 2.0 g/cc by mixing amorphous carbon or graphite with from three to thirty weight percent boric acid or boron oxide in the absence of pitch binder and hot pressing the mixture at a temperature of at least 2000° C. and at pressures of at least 100 kg/cm$^2$ (1420 psi). This reference, however, does not mention or imply that metal borides can be used to advantage as is taught by the present invention. Gasses from volatile matter are produced by the decomposition of the boric oxide or boric acid leaving some voids and pores in the product.

U.S.S.R. Pat. No. 337,372 teaches hot pressing a mixture of coke, pitch and boron at temperatures of at least 2000° C. while under a pressure of 200–300 kg/cm$^2$ (2840–4260 psi).

Mixes that incorporate carbonaceous materials, and boron-containing compounds are also disclosed in U.S. Ser. No. 457,763; U.S. Pat. No. 3,174,872; U.S. Pat. No. 3,284,373 and U.S. Pat. No. 3,672,936.

Impregnating a carbonaceous body with an inorganic ammonium boron compound is taught in U.S. Pat. No. 3,370,967.

Reducing boric anhydride with up to 18% carbon at temperatures of about 2000° C. is disclosed in U.S. Pat. No. 1,019,390.

U.S. Pat. No. 4,188,279 and U.S.S.R. Pat. No. 531,794 disclose compositions consisting of carbonaceous material, pitch binder, and boron compounds. This U.S.S.R. patent also teaches forming the mixture into a shape by hot pressing. A process for producing a graphite boron material, consisting of from 10 to 60 percent by weight boron and from 90 to 40 percent by weight graphite, by hot pressing the mixture at a temperature between 200° C. and 1200° C. and at pressures between 1000 psi and 7000 psi is disclosed in U.S. Pat. No. 2,987,488. None of the materials disclosed had densities above 2.9 gm/cc. U.S. Pat. No. 2,997,744 discloses a method of hot pressing and graphitizing carbonaceous mixtures of pitch, carbon black, and coke or graphite by heating the mixture in a graphite mold to about 2500° C. while applying a pressure of at least 1200 psi. Carbon electrodes containing small quantities of boric acid in the electrode composition are disclosed in U.S. Pat. No. 2,949,430.

An oxidation resistant lightweight refractory that consists of carbonaceous fibrous material and an oxidation resistant, boron containing, material that is formed by hot pressing the mixture at temperatures between 1850° and 2250° C. and at pressures between 2100 psi and 6300 psi is disclosed in U.S. Pat. No. 3,470,003.

Japanese Pat. No. Sho 57 [1982-135775] discloses a method for making a molded carbon product by baking a green coke containing 3 to 15 percent of boron or titanium compounds especially B$_4$C.

None of the above patents, however, discloses or suggests in any manner the present invention.

SUMMARY OF THE INVENTION

The present invention provides a process for making graphite articles comprising blending finely divided green or calcined petroleum or pitch coke or graphite or carbon black or surprisingly thermatomic black, which is generally considered to be a non-graphitizable material, with about 5 to 31, say, 30 percent by weight of a boron containing compound of the group consisting of silicon borides, titanium diborides, vanadium borides, molybdenum borides, chromium borides and mixtures thereof; pressing the resulting mixture in a graphite mold under a pressure of about 800 to 1100 psi, preferably 1000 psi to form a billet; heating the mold and billet to between 1900° C. and 2800° C. under a pressure of about 1000 psi to 4000 psi for about 3 hours using high frequency induction heating or resistance heating at the rate of about 480° C. to 550° C., preferably 500° C. per hour rise and cooling the hot pressed billet in the furnace to approximately room temperature.

In the present process, boron atoms from the boride additive diffuse substitutionally into the graphite structure at temperature around 2000° C. promoting graphitization, densification, and bonding under the applied pressure.

Alternatively, the carbonaceous mixture containing the boron compound additive(s) may be cold pressed followed by sintering without any applied pressure. This cold pressing alternative method utilizes higher molding pressures of the order of 10 to 15 tons per square inch and produces a product that is at least as good as that produced by the alternative hot pressing method.

The improved process offers the following benefits over the conventional method to produce graphite shapes.

Shorter Fabrication Time—Hot pressed shapes can be produced in a few days compared to the several months for the complicated conventional process. Conventional fabrication has two processes, carbonization and graphitization, and it takes a long time to get a final product. The improved process is simple and products can be obtained in one process in a short time.

Increased Rate of Graphitization—The presence of boron increases the graphitization rate of carbonaceous materials. Graphite products prepared by the improved process at about 2300° C. have a degree of graphitization comparable to graphite produced at 2800° to 3000° C. by the conventional process.

Lower Rate of Oxidation—The high density produced and the presence of boron in the graphite structure of shapes prepared by the improved process results in at least a three fold improvement in the oxidation rate at temperatures up to 800° C. when compared to conventional graphite materials.

The invention is illustrated in a non-restricting fashion by the following examples.

EXAMPLE 1

An anisotropic coke was crushed and ball milled to produce a powdered coke of a size such that approximately 90 percent by weight would pass through a 200 Tyler mesh sieve. This sized anisotropic coke shall be identified as Coke A. Chromium diboride ($CrB_2$) was milled using a ball mill to produce a powder of an average particle size that was 2 $\mu$m as measured on a Fisher Sub-Sieve Sizer (FSSS). A blend of the two powders consisting of 88 parts by weight Coke A and 12 parts by weight $CrB_2$ was prepared by blending in a Patterson-Kelly twin-shell blender fitted with an intensifier bar. The blended powders were placed in a graphite die having a 1½" diameter cavity. The die was heated in a graphite tube furnace to a temperature of 2100° C. at a rate of 500° C./hr and held at 2100° C. for two hours. During this heating, pressure was applied ranging from 1000 psig at room temperature to 1500 psig at 2100° C. An atmosphere of argon was used, principally to protect the graphite furnace and die from oxidation. The hot-pressed billet thus produced was cooled to essentially room temperature in the absence of pressure in the argon atmosphere and before it was removed from the die. The properties of samples cut from this billet are presented in Table I.

EXAMPLE 2

An isotropic coke was crushed and milled using a swing-hammer mill to produce a powdered coke of a size such that approximately 55 percent by weight would pass through a 200 Tyler mesh sieve. This sized isotropic coke shall be identified as Coke B. A blend consisting of 66 parts by weight Coke A, 22 parts by weight Coke B, and 12 parts by weight of the milled $CrB_2$ from Example 1 was prepared by blending in a Patterson-Kelly twin-shell blender fitted with an intensifier bar. The blended powders were hot pressed as described in Example 1. The physical properties of samples cut from this billet are presented in Table I.

EXAMPLE 3

A coke flour was prepared by ball milling the anisotropic coke used to prepare Coke A. The average particle size of this coke flour, which shall be identified as Coke C, was 15 $\mu$m, as measured using a FSSS. A blend of 90 parts by weight Coke C and 10 parts by weight of the milled $CrB_2$ from Example 1 was prepared and hot pressed as described in Example 1 except that the pressure used was 1000 psi and the final temperature used was 2250° C. The properties of samples cut from the billet thus produced are presented in Table I.

EXAMPLE 4

A coke flour was prepared by ball milling the isotropic coke used to prepare Coke B. The average particle size of this coke flour, which shall be identified as Coke D, was 1 $\mu$m as measured using a FSSS. A blend of 77.5 parts by weight Coke D and 22.5 parts by weight of the milled $CrB_2$ from Example 1 was prepared and hot pressed as described in Example 3. The properties of samples cut from the billet thus produced are presented in Table I.

EXAMPLE 5

A blend consisting of 94 parts by weight Coke A and 6 parts by weight of the ball milled $CrB_2$ of Example 1 was prepared and hot pressed as described in Example 1 except that the pressure used was 4000 psi and the final temperature was 2300° C. The properties of the billet thus produced are presented in Table I.

The examples of hot pressed material are presented in tabulation form in the table below. This table illustrates the physical properties of the molded products obtained by the hot pressing process of the invention. The examples of the manufacture of the cold pressed materials are presented in conventional form together with Table II and III showing the properties of the cold pressed materials.

TABLE I

Properties of Pitch-Free Graphite Prepared by Hot-Pressing Method From Coke-Chromium Diboride Blends

| EXAMPLE | 1 | 2 | 3 | 4 | 5 |
|---|---|---|---|---|---|
| Property | Coke A + 12% $CrB_2$ | Coke A + 22% Coke B + 12% $CrB_2$ | Coke C + 10% $CrB_2$ | Coke D + 22.5% $CrB_2$ | Coke A + 6% $CrB_2$ |
| Pressure Sintering, psi | 1500 | 1500 | 1000 | 1000 | 4000 |
| Pressure Sintering Temperature, °C. | 2100 | 2100 | 2250 | 2250 | 2300 |
| Billet Diameter, in | 1.5 | 6.5 | 1.5 | 1.5 | 1.5 |
| Density, g/cc | 1.77 | 1.75 | 1.85 | 2.11 | 2.07 |
| % of Theoretical | — | 73 | — | 83 | 90 |
| Flexural Strength, psi | | | | | |
| 25° C. AG | 3400 | 3330 | 4110 | 8100 | 3700 |
| WG | — | 5901 | — | — | — |
| 1500° C. AG | — | 4624 | — | — | — |
| WG | — | 7448 | — | — | — |
| Sonic Modulus, psi × $10^6$ 25° C. | | | | | |
| AG | 0.92 | 1.02 | 0.67 | 3.7 | 0.98 |
| WG | — | 2.26 | — | — | — |
| Electrical Resistivity, microhm-m 25° C. | | | | | |
| AG | 9.09 | 8.8 | 12.91 | 5.9 | 13.8 |
| WG | — | 5.8 | — | — | — |
| Coeff. of Thermal Expansion, in/in/°C. × $10^{-6}$ | | | | | |
| AG | — | 5.5 | — | — | — |
| WG | — | 3.5 | — | — | — |
| Permeability, Darcy's | — | 0.000019 | — | — | — |
| Interlayer Spacing, Å | 3.360 | 3.357 | — | — | 3.367 |

NOTES:
All percentages are expressed on a weight basis.
Coke A is anisotropic petroleum coke, 90% −200 Tyler mesh.
Coke B is isotropic petroleum coke, 55% −200 Tyler mesh.
Coke C is Coke A ball milled to 15 μm by FSSS.
Coke D is Coke B ball milled to 1 μm by FSSS.

Table I shows that the shaped articles of the subject invention have a high density, high flexural strength and low specific electrical resistivity.

The following additional examples of pitch-free processing of carbonaceous mixtures with boron compound additives illustrate the cold-pressing method followed by sintering without applied pressure. It should be noted that Example 6 also shows that isostatic pressing is a suitable alternative to pressing in a steel die.

EXAMPLE 6

An artificial graphite was ball-milled for about 50 hours to produce a flour whose average particle size, as measured on a Fisher Sub-Sieve Sizer (FSSS), was 1.7 microns. Chromium diboride was similarly ball-milled for 50 hours, producing a flour of average particle size of 1.5 microns. A blend was prepared using 69.2 parts by weight of graphite and 30.8 parts by weight of $CrB_2$ by using the blender of Example 1. The blend was then formed at room temperature by two methods:

(a) molded in a steel die 1.25" in diameter at a pressure of 15 tons per square inch to form a sample about 1" long.

(b) isostatically molded by a standard vacuum-pressure technique to a pressure of 10 tons per square inch to form a sample 1.25" in diameter by 4" long.

Both formed bodies were sintered using a heating rate of 300° C./hour to a final temperature of 2200° C., held at that temperature for one hour, and allowed to cool, all steps being conducted in an argon atmosphere.

The properties of the two samples are presented in Table II.

TABLE II

Physical Properties of Pitch-Free Graphite by Cold Pressing and Sintering Method from Graphite Flour-Chromium Diboride Blends

| | Sample 6(a) | Sample 6(b) |
|---|---|---|
| Density before sintering (% of theoretical) | 78 | 70.1 |
| Density after 2200° C. sintering (% of theoretical) | 75 | 72 |
| Linear shrinkage on sintering (%) | −1.1* | −1.0* |
| Flexural strength (psi, with-grain) | 13,800 | 9,400 |
| Sonic Modulus (psi × $10^6$, with-grain) | 5.19 | 4.1 |
| Electrical Resistivity (μΩm, with-grain) | 4.45 | 6.3 |

*Negative value indicates expansion on sintering.

EXAMPLE 7

A raw (i.e., green or uncalcined) petroleum coke was ball-milled to produce a coke flour with an average particle size of 1.5 microns as measured on a FSSS. This coke flour was blended with the 1.5 micron $CrB_2$ flour from Example 6 in a ratio of 69.2 parts by weight coke and 30.8 parts by weight $CrB_2$. The blend was molded in a steel die at a pressure of 15 tons per square inch and sintered using the method described in Example 6. A similar product was produced from the same 1.5 micron petroleum coke flour without any additive. The physical properties for these two materials are shown in Table III.

TABLE III

Physical Properties of Pitch-Free Compacts Prepared by Cold Pressing and Sintering Method from Plain Coke and a Coke-Chromium Diboride Blend

| | Coke | Coke + 30.8% CrB$_2$ |
|---|---|---|
| Density before sintering (% of theoretical) | 57 | 56 |
| Density after 2200° C. sintering (% of theoretical) | 73 | 77 |
| Linear shrinkage on sintering | 13 | 11 |
| Flexural Strength (psi, with-grain) | 2,000 (Est.) | 7,871 |

Two additional examples are presented to show that the hot-pressing method can be used to make highly graphitic articles from a thermatomic black, Thermax, which is normally considered to be a non-graphitizible carbon.

EXAMPLE 8

A blend consisting of 30.8 parts by weight CrB$_2$ powder of Example 1 and 69.2 parts by weight of Thermax thermatomic black having an average particle size of approximately 0.5 μm (FSSS) was prepared in a Patterson-Kelly twin-shell blender fitted with an intensifier bar. The blend was hot pressed according to Example 1 except that the final temperature was 2200° C. and the billet had a diameter of 2". The properties of samples cut from this billet are presented in Table IV. Of specific importance is the low resistivity and the interlayer spacing which indicate complete graphitization of the thermatomic black, which is normally considered to be "ungraphitizible."

EXAMPLE 9

A coke flour was prepared by ball milling the isotropic coke used to prepare Coke B. The average particle size of this coke flour, which shall be identified as Coke E, was 1.5 μm as measured using a FSSS. A blend was prepared of 34.6 parts by weight of Coke E, 34.6 parts by weight of the Thermax that was described in Example 8, and 30.8 parts by weight of the CrB$_2$ that is described in Example 8. The blending and hot pressing of this blend was as described in Example 8. The properties of samples cut from the billet thus produced are shown in Table IV.

TABLE IV

Properties of Pitch-Free Graphite Prepared by Hot-Pressing Method From Blends Containing Thermax and Chromium Diboride

| EXAMPLE | 8 | 9 |
|---|---|---|
| Property | Thermax + 30.8% CrB$_2$ | Thermax + 34.6% Coke E + 30.8% CrB$_2$ |
| Pressure Sintering, psi | 1500 | 1500 |
| Pressure Sintering Temperature, °C. | 2200 | 2200 |
| Billet Diameter, in | 2.0 | 2.0 |
| Density, % of Theoretical | 75 | 74 |
| Flexural Strength, psi 25° C. | | |
| AG | 7200 | 8380 |
| WG | 7400 | 8990 |
| Sonic Modulus, psi × 10$^6$ 25° C. | | |
| AG | 3.3 | 2.9 |
| WG | 4.0 | 3.6 |
| Electrical Resistivity, microhm-m 25° C. | | |
| AG | 4.8 | 5.4 |
| WG | 4.4 | 5.0 |
| Permeability, Darcy's | 0.052 | 0.0042 |
| Interlayer Spacing, Å | 3.326 | — |

In the practice of the invention there can be used various types of carbon such as calcined pitch coke, artificial graphite powder, animal carbon or coke graphitized by baking at above 1500° C. The material used should preferably be pulverized to a particle size smaller than about 15 microns. The boron containing additive should be homogeneously mixed and dispersed in the carbonaceous powder. Preferably both are comminuted to the same size in the same milling equipment.

The shaped articles of the subject process can be used, inter alia, for electrode purposes as electrodes and the like.

While there have been described what are at present considered preferred embodiments of the invention, it will be obvious to those skilled in the art that minor modifications and changes may be made without departing from the essence of the invention. It is therefore to be understood that these exemplary embodiments are illustrative and not restrictive to the invention, the scope of which is defined in the appended claims and that all modification that come within the meaning and ranges of equivalency of the claims are intended to be included therein.

What is claimed is:

1. A process for making pitch-free shaped graphitic articles comprising the steps of blending finely divided carbonaceous particles of carbon black or thermatomic black, with from about 5 to about 31 percent by weight of a metal boride selected from the group consisting of silicon borides, titanium borides, vanadium borides, molybdenum borides, chromium borides and mixtures thereof, shaping the resultant mixture under pressure and either simultaneously or subsequently heating the formed mixture in the absence of pitch or other conventional binder to between about 1900° C. and 2800° C.

2. The process of claim 1, wherein the resulting mixture is heated between about 1900° C. and 2800° C. under a pressure of between about 1000 psi to about 4000 psi for about 1 to 3 hours at a rate of about 450° to 550° C. rise per hour.

3. The process of claim 1, wherein said mixture is prepressed under a pressure of about 800 to 1100 psi to form a billet.

4. The process of claim 3, wherein said prepressing is effected under a pressure of about 1000 psi.

5. The process of claim 1 or 2, wherein said heating is effected by high frequency induction heating.

6. The process of claim 2, wherein said heating is effected by resistance heating.

7. The process of claim 1 wherein said compound is chromium diboride (CrB$_2$).

8. The process of claim 1 or 7 wherein said pressing is performed at room temperature at a pressure of between about 10 and 15 tons per square inch followed by sintering the formed article in an inert atmosphere at a heating rate of about 300° C./hour to a final temperature of 2200° C., holding said sintered article at that temperature for about one hour followed by cooling at a natural rate.

9. The process of claim 8 wherein said sintering is performed in an argon atmosphere.

10. The process of claim 1 or 7 wherein said carbonaceous particles are thermatomic carbon black.

* * * * *

UNITED STATES PATENT AND TRADEMARK OFFICE
CERTIFICATE OF CORRECTION

PATENT NO. : 4,670,201

DATED : June 2, 1987

INVENTOR(S) : Montgomery et al.

It is certified that error appears in the above-identified patent and that said Letters Patent is hereby corrected as shown below:

At col. 2, line 38, "2.9 gm/cc" should be --1.9 gm/cc --;

At col. 3, line 13, "temperature" should be -- temperatures --.

Signed and Sealed this

Thirteenth Day of June, 1989

*Attest:*

DONALD J. QUIGG

*Attesting Officer*      *Commissioner of Patents and Trademarks*